(12) United States Patent
Lee et al.

(10) Patent No.: US 10,818,932 B2
(45) Date of Patent: Oct. 27, 2020

(54) METAL AIR BATTERY AND METHOD OF MANUFACTURING GAS DIFFUSION LAYER INCLUDED IN METAL AIR BATTERY

(71) Applicants: SAMSUNG ELECTRONICS CO., LTD., Suwon-si, Gyeonggi-do (KR); Seoul National University R&DB Foundation, Seoul (KR)

(72) Inventors: Dongjoon Lee, Suwon-si (KR); Chong rae Park, Seoul (KR); Yeonsu Jung, Seoul (KR); Young shik Cho, Seoul (KR); Minhoo Byeon, Seoul (KR); Hyukjae Kwon, Suwon-si (KR); Mokwon Kim, Suwon-si (KR); Joonhee Kim, Seoul (KR); Hyunjin Kim, Seoul (KR); Hyunpyo Lee, Seoul (KR); Heungchan Lee, Seongnam-si (KR); Dongmin Im, Seoul (KR)

(73) Assignees: SAMSUNG ELECTRONICS CO., LTD., Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 111 days.

(21) Appl. No.: 16/134,212

(22) Filed: Sep. 18, 2018

(65) Prior Publication Data
US 2019/0198887 A1 Jun. 27, 2019

(30) Foreign Application Priority Data
Dec. 21, 2017 (KR) .................. 10-2017-0177486

(51) Int. Cl.
H01M 4/88 (2006.01)
H01M 12/08 (2006.01)
(Continued)

(52) U.S. Cl.
CPC ......... H01M 4/8807 (2013.01); C01B 32/164 (2017.08); H01M 4/382 (2013.01);
(Continued)

(58) Field of Classification Search
CPC ..... H01M 4/8807; H01M 4/382; H01M 4/405
See application file for complete search history.

(56) References Cited

U.S. PATENT DOCUMENTS 8,822,078 B2 9/2014 Landi et al.
2008/0280164 A1* 11/2008 Atanasoski ......... H01M 4/8807
429/431
(Continued)

FOREIGN PATENT DOCUMENTS

KR 1020140041050 A 4/2014
KR 1020160046102 A 4/2016

OTHER PUBLICATIONS

Huang et al, "Carbon nanotubes as a secondary support of a catalyst layer in a gas diffusion electrode for metal air batteries" Journal of Colloid and Interface Science, vol. 284, pp. 593-599. (Year: 2005).*
(Continued)

Primary Examiner — Amanda C. Walke
(74) Attorney, Agent, or Firm — Cantor Colburn LLP (57) ABSTRACT

A gas diffusion layer for a metal-air battery may include a plurality of carbon nanotube thin films that are arranged to be stacked, and the carbon nanotube thin films may include a plurality of first carbon nanotubes arranged in a predetermined direction. The gas diffusion layer for the metal-air battery may include a plurality of carbon nanotube thin films in which a plurality of carbon nanotubes are arranged such that they cross each other by a floating catalyst chemical vapor deposition ("FCCVD") method.

16 Claims, 9 Drawing Sheets

(51) Int. Cl.
*H01M 4/38* (2006.01)
*H01M 4/96* (2006.01)
*H01M 4/40* (2006.01)
*C01B 32/164* (2017.01)
*H01M 4/86* (2006.01)

(52) U.S. Cl.
CPC .............. *H01M 4/405* (2013.01); *H01M 4/96* (2013.01); *H01M 12/08* (2013.01); *H01M 2004/8689* (2013.01)

(56) References Cited

U.S. PATENT DOCUMENTS

| | | | | |
|---|---|---|---|---|
| 2009/0197038 A1* | 8/2009 | Wang | ................... | B01J 37/0219 428/114 |
| 2011/0097512 A1* | 4/2011 | Zhou | ....................... | H01B 1/04 427/545 |
| 2011/0256457 A1* | 10/2011 | Utsumi | ............. | H01M 10/0525 429/336 |
| 2012/0301663 A1* | 11/2012 | Koike | ..................... | H01G 11/28 428/114 |
| 2013/0171504 A1* | 7/2013 | Wang | ..................... | H01M 4/663 429/156 |
| 2015/0207143 A1* | 7/2015 | Wu | ................... | H01M 10/0525 429/231.8 |
| 2016/0380273 A1* | 12/2016 | Wu | ........................ | H01M 4/96 429/405 |
| 2018/0026258 A1* | 1/2018 | Yan | ....................... | H01M 4/623 429/231.8 |
| 2018/0026269 A1* | 1/2018 | Yan | ....................... | H01M 4/663 429/231.8 |
| 2019/0036186 A1* | 1/2019 | Kim | .................... | H01M 4/8867 |

OTHER PUBLICATIONS

M.J. Palmeri et al., Multi-scale reinforcement of CFRPs using carbon nanofibers, 2011, pp. 79-86, 71, Composites Science and Technology, Elsevier.

* cited by examiner

METAL AIR BATTERY AND METHOD OF MANUFACTURING GAS DIFFUSION LAYER INCLUDED IN METAL AIR BATTERY

CROSS-REFERENCE TO RELATED APPLICATION

This application claims priority to Korean Patent Application No. 10-2017-0177486, filed on Dec. 21, 2017, and all the benefits accruing therefrom under 35 U.S.C. § 119, the content of which in its entirety is herein incorporated by reference.

BACKGROUND

1. Field

Embodiments of the invention relate to metal air batteries and methods manufacturing a gas diffusion layer included in the metal air batteries, and more particularly, to metal air batteries having high energy density and methods of manufacturing a gas diffusion layer included in the metal air batteries.

2. Description of the Related Art

A lithium-air battery includes an anode that may adsorb/discharge lithium ions, a cathode that oxidizes/reduces oxygen in air, and an electrolyte between the anode and the cathode.

The lithium-air battery uses lithium itself as an anode, and, because it is unnecessary to store air (in detail, oxygen in the air) which is a cathode active material in the lithium-air battery, the lithium-air battery may have a high capacity. A theoretical energy density per unit weight of the lithium-air battery is greater than 3,500 watt-hours per kilogram (Wh/kg). The energy density of the lithium-air battery corresponds to approximately 10 times that of a lithium ion battery.

A gas diffusion layer is arranged between two adjacent cathodes in order to diffuse oxygen into a lithium-air battery. Oxygen moves to a cathode through the gas diffusion layer and reacts with lithium ions in the cathode. A gas diffusion layer used in the related art includes a carbon group material, such as carbon paper or carbon cloth.

SUMMARY

When a carbon group material of a gas diffusion layer has a thickness in a range of 200 micrometers ($\mu m$) to 400 $\mu m$, a weight per unit area is approximately as much as 4 to 10 milligrams per square centimeter ($mg/cm^2$). Accordingly, in order to increase an energy density of a lithium-air battery, it is necessary to reduce a weight of the gas diffusion layer.

Provided are metal air batteries and methods manufacturing a gas diffusion layer included in the metal air batteries, and more particularly, to metal air batteries having high energy density and methods of manufacturing a gas diffusion layer included in the metal air batteries.

Additional embodiments will be set forth in part in the description which follows and, in part, will be apparent from the description, or may be learned by practice of the presented embodiments.

According to an embodiment, a metal-air battery includes an anode layer including a metal, a cathode layer that includes a cathode catalyst layer and uses oxygen as an active material, a gas diffusion layer that is in contact with the cathode layer and includes a plurality of carbon nanotube thin films stacked on each other, where the gas diffusion layer has an average tensile strength of 20 megapascals (MPa) or above, and an electrolyte film between the anode layer and the cathode layer, where the plurality of carbon nanotube thin films include a first carbon nanotube thin film including a plurality of first carbon nanotubes extending in a first direction, and a second carbon nanotube thin film including a plurality of second carbon nanotubes extending in a second direction.

In an embodiment, the first and second carbon nanotube thin films may have a flat plate form, and the flat-type first and second carbon nanotube thin films may be stacked parallel to each other.

In an embodiment, the plurality of first carbon nanotubes included in the first carbon nanotube thin film may be respectively aligned in a direction perpendicular to the first direction and the plurality of second carbon nanotubes included in the second carbon nanotube thin film may respectively be aligned in a direction perpendicular to the second direction.

In an embodiment, the alignment direction perpendicular to the first direction and an alignment direction perpendicular to the second direction may be different from each other.

In an embodiment, an alignment angle of the first carbon nanotubes may have a deviation in a range of 0 degree (°) to 45° in a clockwise direction or a counter-clockwise direction, and an alignment angle of the second carbon nanotubes may have a deviation in a range of 0° to 45° in the clockwise direction or the counter-clockwise direction.

In an embodiment, the first carbon nanotube thin film and the second carbon nanotube thin film may have different porosities from each other.

In an embodiment, the first carbon nanotube thin film and the second carbon nanotube thin film may have different electrical conductivities from each other.

In an embodiment, one of the first carbon nanotube thin film and the second carbon nanotube thin film may have an average electrical conductivity of less than 0.1 Siemen per centimeter (S/cm).

In an embodiment, the cathode layer, the electrolyte film, the anode layer, and the gas diffusion layer may be folded at least once.

In an embodiment, the gas diffusion layer may have oxygen permeability in a thickness direction thereof.

In an embodiment, the gas diffusion layer may have a thickness of less than 100 micrometers ($\mu m$) and may have a weight per unit area of less than 1 milligram per square centimeter ($mg/cm^2$).

In an embodiment, the first carbon nanotubes and the second carbon nanotubes may be single carbon nanotubes, carbon nanotube bundles, or twisted carbon nanotubes.

According to an embodiment, a method of manufacturing a gas diffusion layer includes supplying a carbon nanotube precursor and a catalyst precursor into a reaction chamber, generating catalyst particles by thermally decomposing the catalyst precursor in the reaction chamber, forming a plurality of carbon nanotubes by thermally decomposing the carbon nanotube precursor in the reaction chamber, and attaching the plurality of carbon nanotubes to a surface of a roller unit that rotates with respect to an axis, where the roller unit forms a plurality of carbon nanotube thin films by repeatedly rotating at least twice.

In an embodiment, the plurality of carbon nanotubes included in the plurality of first carbon nanotube thin films may respectively be aligned along a direction perpendicular to a direction in which the plurality of carbon nanotubes extends, and an alignment angle of the plurality of carbon nanotubes may have a deviation in a range of 0° to 45° in a clockwise direction or a counter-clockwise direction.

In an embodiment, the roller unit simultaneously may perform a rotational motion and a translational motion in which the roller unit moves along a direction of the axis.

In an embodiment, first carbon nanotubes included in a first carbon nanotube thin film may respectively be aligned along a direction perpendicular to a direction in which the first carbon nanotubes extend, and second carbon nanotubes included in a second carbon nanotube thin film may respectively be aligned along a direction perpendicular to a direction in which the second carbon nanotubes extend, where the alignment direction perpendicular to the extending direction of the first carbon nanotubes and the alignment direction perpendicular to the extending direction of the second carbon nanotubes are different from each other.

BRIEF DESCRIPTION OF THE DRAWINGS

These and/or other embodiments will become apparent and more readily appreciated from the following description of the embodiments, taken in conjunction with the accompanying drawings in which.

DETAILED DESCRIPTION

Hereinafter, metal air batteries according to embodiments will now be described in detail with reference to the accompanying drawings. In the drawings, like reference numerals refer to like elements throughout, and also, sixes of constituent elements may be exaggerated for clarity and convenience of explanation. Also, the embodiments may have different forms and should not be construed as being limited to the descriptions set forth herein. It will also be understood that when an element is referred to as being "on" or "above" another element, the element may be in direct contact with the other element or other intervening elements may be present. Also, in the specification, "a first surface" and "a second surface" may denote two surfaces that are located in directly opposite sides, and "a direction" and "another direction" may denote that two directions that are directly opposite directions. Also, in the specification, the terminology "air" may denote atmospheric air, a composite gas including oxygen, and pure oxygen gas.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 1A:
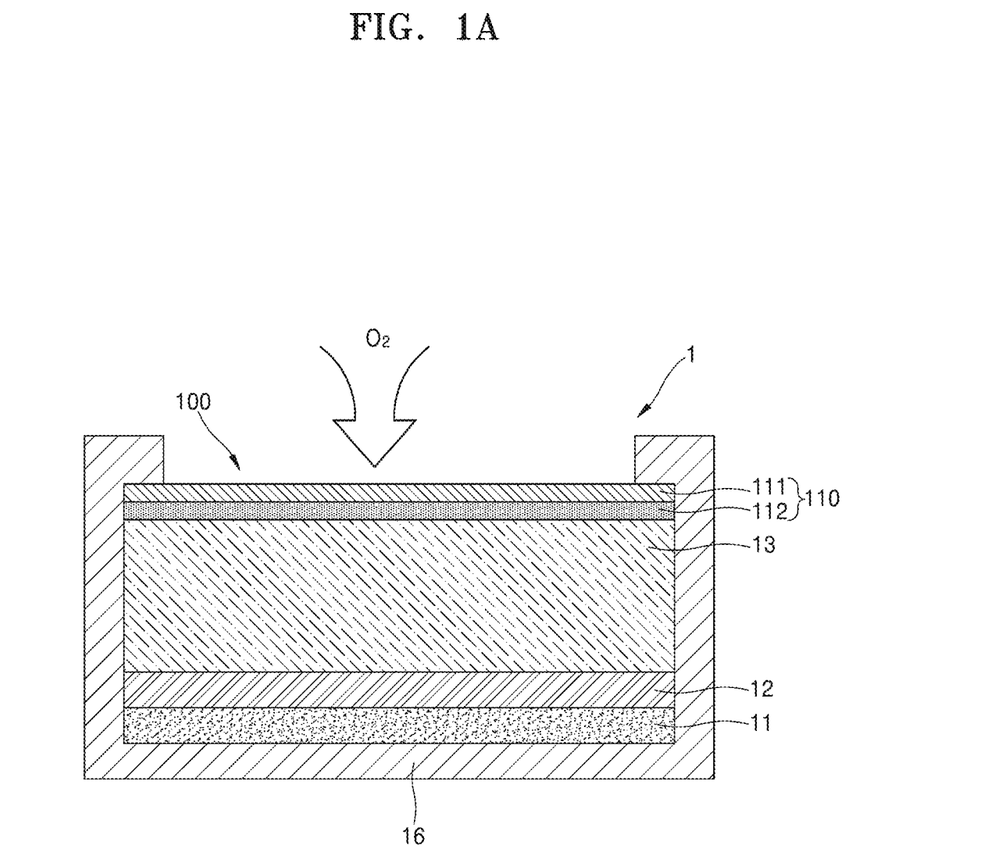
FIG. 1A is a schematic cross-sectional view of an embodiment of a two dimensional ("2D")-flat-cell type metal air battery.
Figure 1B:
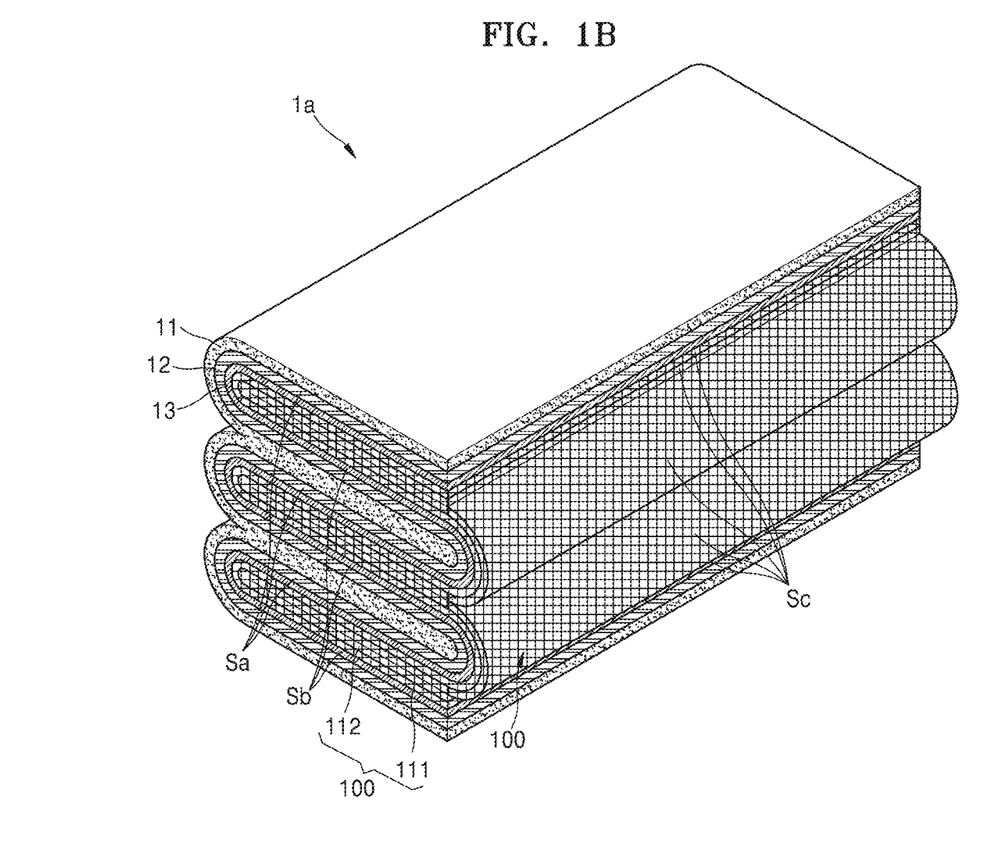
FIG. 1B is a schematic perspective view of an embodiment of a three dimensional ("3D")-type metal air battery.

FIG. 1A is a schematic cross-sectional view of a two dimensional ("2D") flat-cell type metal air battery 1 according to an embodiment. FIG. 1B is a schematic perspective view of a three dimensional ("3D") type metal air battery 1a according to an embodiment.

Referring to FIG. 1A, the 2D flat-cell type metal air battery 1 according to an embodiment may include an anode layer 11, an electrolyte film 12, a cathode layer 13, a gas diffusion layer for a metal-air battery (hereinafter, a gas diffusion layer) 100 and an exterior member 16 that surrounds the whole 2D flat-cell type metal air battery 1 except for an upper surface of the gas diffusion layer 100.

As an example, the anode layer 11 may include Li metal that may adsorb and discharged lithium ions and a binder. In an embodiment, the anode layer 11 may include a lithium metal based alloy or a lithium intercalating compound besides the lithium metal, for example. The electrolyte film 12 may be arranged between the anode layer 11 and the cathode layer 13, and may include an electrolyte that may transfer lithium ions generated from the anode layer 11 to the cathode layer 13. The cathode layer 13 may include an electrolyte for transferring lithium ions, a catalyst for oxidation and reduction of oxygen, a conductive material, and a binder. The gas diffusion layer 100 absorbs oxygen in the air and provides the oxygen to the cathode layer 13. For this purpose, the gas diffusion layer 100 may have a porous structure so as to smoothly diffuse oxygen in the air.

In the case of the 2D flat-cell type metal air battery 1, when a plurality of cells is vertically stacked, oxygen supply to the lower cells may not be smooth. Also, of a total weight of the 2D flat-cell type metal air battery 1, a weight ratio of a current collector (not shown) for collecting a current is significantly great, and thus, a ratio of a sum of weights of the anode layer 11, the electrolyte film 12, and the cathode layer 13 those contribute to the energy density may be relatively small. Referring to FIG. 1B, the 3D type metal air battery 1a according to an embodiment may include a cathode layer 13, the electrolyte film 12, the anode layer 11, and the gas diffusion layer 100.

The gas diffusion layer 100 according to an embodiment may include a first surface Sa, a second surface Sb facing the first surface Sa, and a side surface Sc that may be exposed to the outside.

The cathode layer 13, the electrolyte film 12, and the anode layer 11 are folded at least once so as the contact the first surface Sa and the second surface Sb of the gas diffusion layer 100, and the gas diffusion layer 100 may be arranged between the folded cathode layer 13. In an embodiment, when the cathode layer 13, the electrolyte film 12, and the anode layer 11 are folded at least twice, as depicted in FIG. 1B, the cathode layer 13, the electrolyte film 12, and the anode layer 11 may be alternately folded, that is, they are folded in a direction, and afterwards, are folded in another direction, for example.

The cathode layer 13, the electrolyte film 12, and the anode layer 11 respectively may be folded in a thickness direction with a certain width. In the specification, "a width" and "a length" of a constituent element may be distinguished by size, and the width is less than the length.

As described above, in a structure that the cathode layer 13 are arranged on the first surface Sa and the second surface Sb of the gas diffusion layer 100, the first surface Sa and the second surface Sb of the gas diffusion layer 100 are not exposed to the outside. Accordingly, air supply to the gas diffusion layer 100 may be realized through side surfaces or portions of the side surfaces of the gas diffusion layer 100, and since oxygen permeability is provided along a thickness direction of the gas diffusion layer 100, air may be diffused to the cathode layer 13. In an embodiment, the supply of air to the gas diffusion layer 100 may be realized through at least the side surface Sc of the side surfaces, and thus, may diffuse to the cathode layer 13 through the first surface Sa and the second surface Sb of the gas diffusion layer 100 along the thickness direction of the gas diffusion layer 100, for example.

The metal air battery 1a may have a structure in which air supply is smoothly realized by side surfaces exposed to the outside of the gas diffusion layer 100. Although it is not depicted in the drawing, an exterior member (not shown) may surround whole surfaces of the anode layer 11, the electrolyte film 12, the cathode layer 13, and the gas diffusion layer 100 except for the exposed side surface Sc of the gas diffusion layer 100. The gas diffusion layer 100 described above should have a light-weight to ensure a high energy density together with a higher electrical conductivity and gas diffusivity.

The gas diffusion layer 100 according to an embodiment may include a plurality of carbon nanotube thin films 110 that are arranged to be stacked with each other. As an example, the carbon nanotube thin films 110 may include a first carbon nanotube thin film 111 including a plurality of first carbon nanotubes 1110 (refer to FIG. 2B) extending along a first direction, and a second carbon nanotube thin film 112 including a plurality of second carbon nanotubes 1120 (refer to FIG. 2B) extending along a second direction.

In the embodiment, since the gas diffusion layer 100 includes the carbon nanotube thin films 110, for example, the first carbon nanotube thin film 111 and the second carbon nanotube thin film 112 that are stacked with each other, the gas diffusion layer 100 having a less weight and a high electrical conductivity and gas diffusivity may be provided when compared to a gas diffusion layer including a carbon paper of the related art. Accordingly, the metal air battery 1a including the gas diffusion layer 100 may have a high energy density. Hereinafter, the gas diffusion layer 100 according to an embodiment will now be described in detail.

Figure 2A:
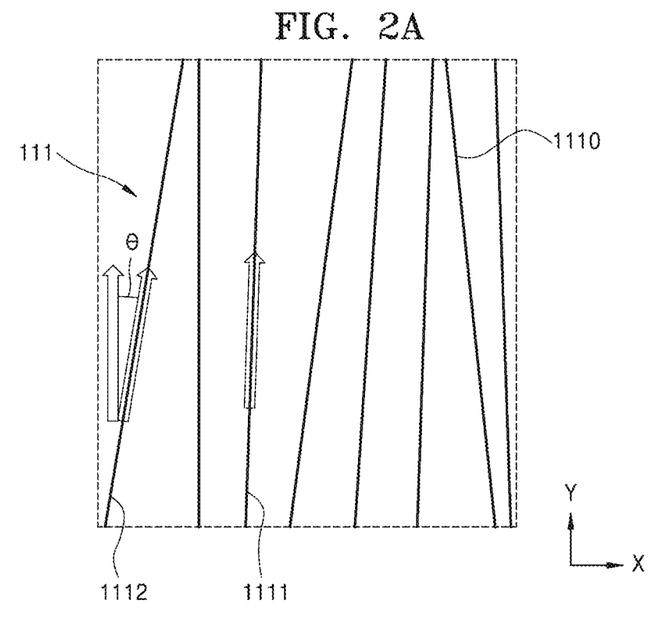
FIG. 2A is a schematic diagram of an embodiment of a first carbon nanotube thin film.
Figure 2B:
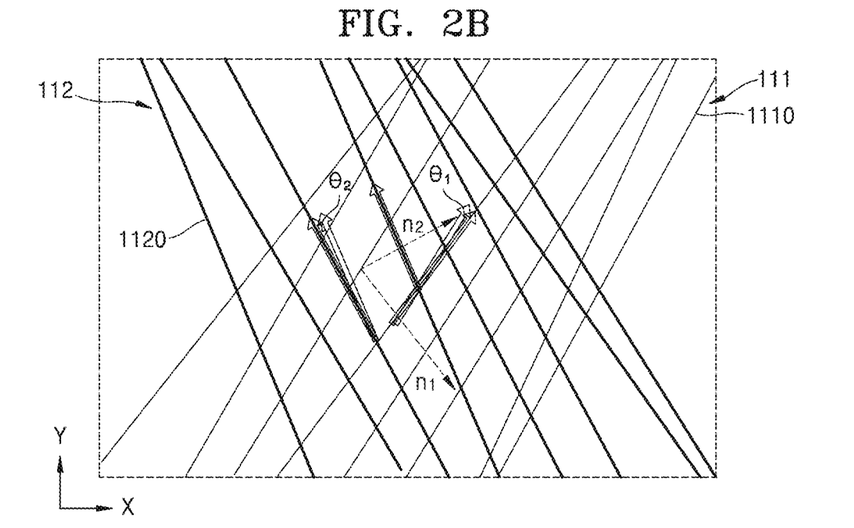
FIG. 2B is a schematic diagram of an embodiment of a first carbon nanotube thin film and a second carbon nanotube.
Figure 2C:
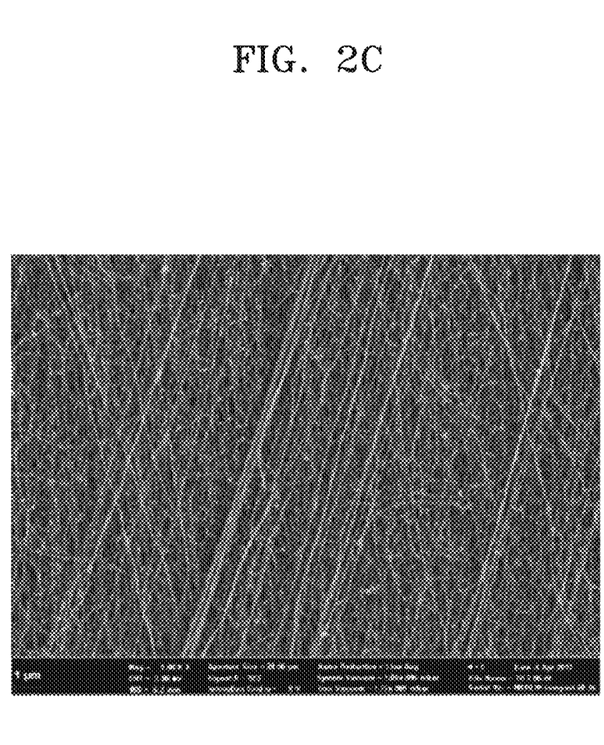
FIG. 2C is a scanning electron microscope ("SEM") image of a gas diffusion layer formed by a floating catalyst chemical vapor deposition ("FCCVD") method.

FIG. 2A is a schematic diagram of a first carbon nanotube thin film according to an embodiment. FIG. 2B is a schematic diagram of a first carbon nanotube thin film and a second carbon nanotube according to an embodiment. FIG. 2C is a scanning electron microscope ("SEM") image of a gas diffusion layer formed by a floating catalyst chemical vapor deposition ("FCCVD") method.

Referring to FIG. 2A, the first carbon nanotubes 1110 included in the first carbon nanotube thin film 111 according to an embodiment may be arranged in a perpendicular direction to an extending direction. As an example, the first carbon nanotubes 1110 included in the first carbon nanotube thin film 111 may be, for example, one of single walled carbon nanotube ("SWNT"), double-walled carbon nanotube ("DWNT"), or multi-walled carbon nanotube ("MWNT"). Also, the first carbon nanotubes 1110 included in the first carbon nanotube thin film 111 may be single nanotubes, may each be a bundle of nanotubes in which a plurality of nanotubes, for example, 2 to 25 carbon nanotubes, together form a single fiber, or may have a twisted structure of a plurality of carbon nanotubes.

Also, the first carbon nanotubes 1110 according to an embodiment may have an average length in the extending direction greater than 50 micrometers ($\mu m$) to less than 1 centimeter (cm), may have an average diameter greater than 1 nm to less than 50 $\mu m$, and may have an aspect ratio greater than $5 \times 10^4$ to less than $10^7$, for example.

Also, the first carbon nanotubes 1110 according to an embodiment may be arranged to have a predetermined alignment angle $\theta$. In the specification, the alignment angle $\theta$ is defined by an angle between an extending direction of one of the first carbon nanotubes 1110 that is a reference carbon nanotube and an extending direction of another first carbon nanotube 1110. In an embodiment, as depicted in FIG. 2A, an extending direction of a 1-1 carbon nanotube 1111 and an extending direction of another 1-2 carbon nanotube 1112 may be different, for example. At this point, the 1-1 carbon nanotube 1111 which is a reference carbon nanotube and the 1-2 carbon nanotube 1112 may be arranged to have a predetermined angle $\theta$. As an example, a deviation of the alignment angle $\theta$ of the first carbon nanotubes 1110 may be in a range from 0° to 45° in a clockwise direction or a counter clockwise direction.

Referring to FIG. 2B and FIG. 2C, the second carbon nanotube thin film 112 according to an embodiment may be arranged to be stacked on the first carbon nanotube thin film 111. At this point, a plurality of second carbon nanotubes 1120 may be included in the second carbon nanotube thin film 112. The second carbon nanotubes 1120 according to an embodiment may be aligned in a direction perpendicular to the extending direction. The descriptions related to the second carbon nanotubes 1120 are substantially the same as the first carbon nanotubes 1110, and thus, for convenience, the descriptions thereof will be omitted.

In the first carbon nanotube thin film 111 and the second carbon nanotube thin film 112 that are arranged to be stacked with each other, as described above, the alignment direction $n_1$ of the first carbon nanotubes 1110 and the alignment direction $n_2$ of the second carbon nanotubes 1120 may be defined as a direction perpendicular to the extending direction of carbon nanotubes, and the alignment direction $n_1$ of the first carbon nanotubes 1110 and the alignment direction $n_2$ of the second carbon nanotubes 1120 may be different from each other. Also, the first carbon nanotubes 1110 and the second carbon nanotubes 1120 according to an embodiment respectively included in the first carbon nanotube thin film 111 and the second carbon nanotube thin film 112 may be arranged to mutually have alignment angles $\theta_1$ and $\theta_2$ greater than 0° to less than 45° along a clockwise direction or a counter clockwise direction between a reference carbon nanotube and other carbon nanotubes.

As described above, since the first carbon nanotubes 1110 and the second carbon nanotubes 1120 have alignment directions $n_1$ and $n_2$ different from each other and alignment angles $\theta_1$ and $\theta_2$ different from each other, the first carbon nanotube thin film 111 and the second carbon nanotube thin film 112 may be formed to have porosities different from each other. Accordingly, gas diffusivities of the first carbon nanotube thin film 111 and the second carbon nanotube thin film 112 may be different from each other. As an example, the gas diffusivity of the first carbon nanotube thin film 111 may be greater than that of the second carbon nanotube thin film 112.

Also, since the first carbon nanotubes 1110 and the second carbon nanotubes 1120 have alignment directions $n_1$ and $n_2$ different from each other and alignment angles $\theta_1$ and $\theta_2$ different from each other, the dense degree of carbon nanotubes may be changed. Accordingly, electrical conductivities of the first carbon nanotube thin film 111 and the second carbon nanotube thin film 112 may be different. As an example, one of the first carbon nanotube thin film 111 and the second carbon nanotube thin film 112 may have an average electrical conductivity of 0.1 Siemen per centimeter (S/cm) or less. Also, the gas diffusion layer 100 in which the first carbon nanotube thin film 111 including first carbon nanotubes 1110 and the second carbon nanotube thin film 112 including second carbon nanotubes 1120 are stacked may have a thickness of 100 $\mu m$ or less, and may have a weight per unit area of 1 milligram per square centimeter ($mg/cm^2$) or less. Accordingly, the gas diffusion layer 100 including the carbon nanotube thin films 110 according to an embodiment may have a less weight but has a high electrical conductivity and gas diffusivity when compared to a gas diffusion layer of the related art. Accordingly, the metal air battery 1a including the gas diffusion layer 100 according to an embodiment may have a high energy density.

Figure 3:
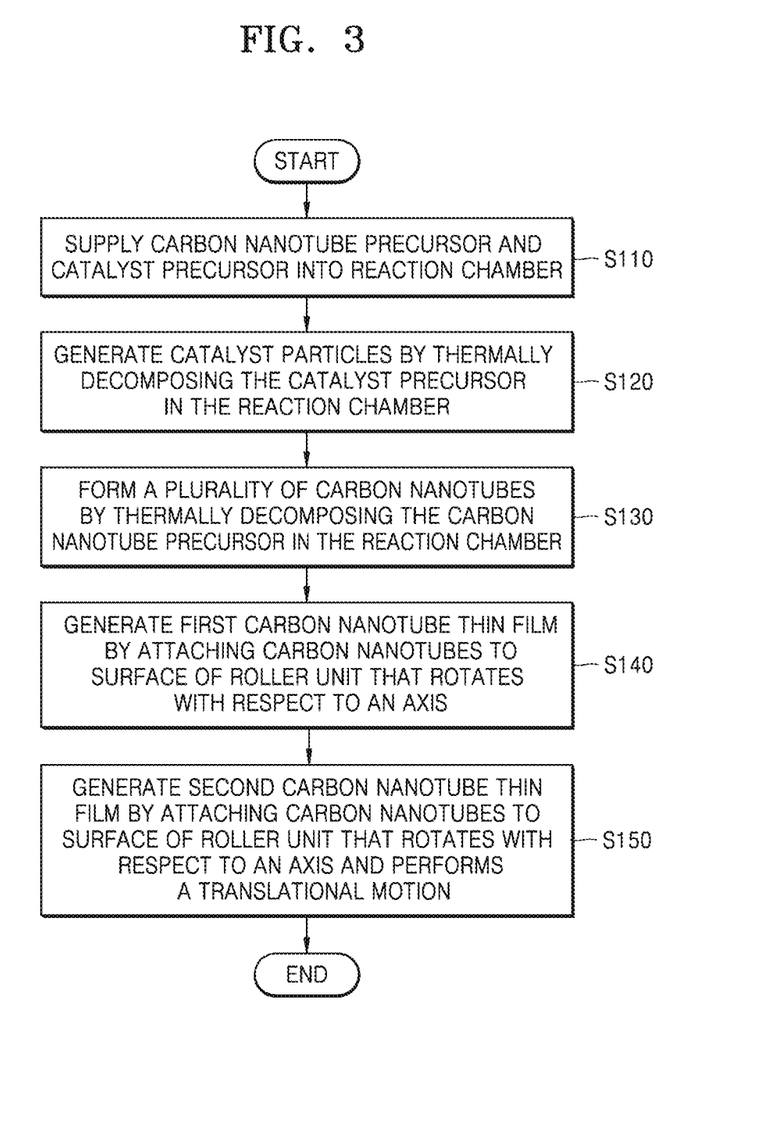
FIG. 3 is a flowchart of an embodiment of a method of manufacturing a carbon nanotube thin film.
Figure 4:
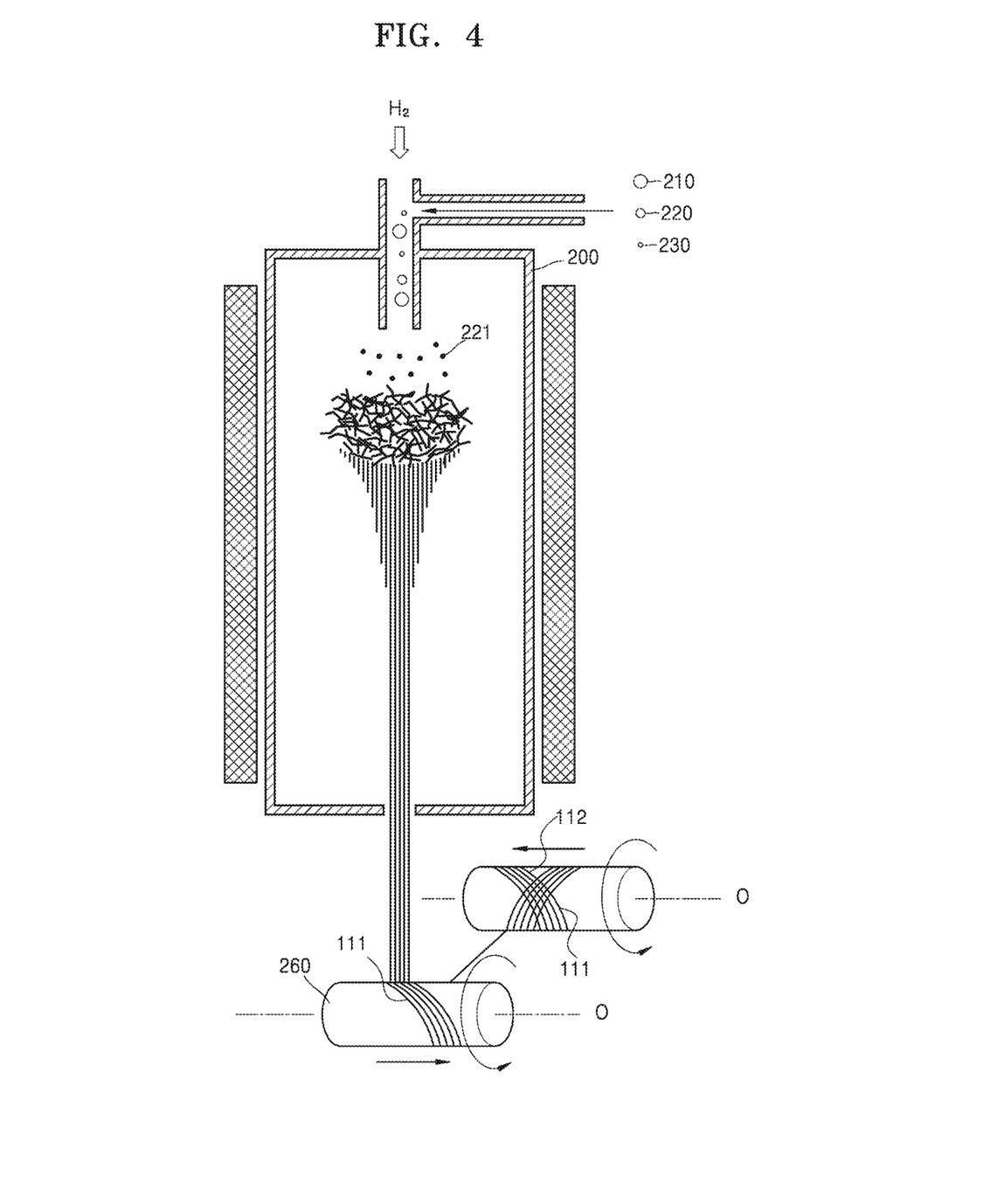
FIG. 4 is a schematic cross-sectional view showing an embodiment of a method of manufacturing a carbon nanotube thin film.

FIG. 3 is a flow chart of a method of manufacturing a carbon nanotube thin film according to an embodiment. FIG. 4 is a schematic cross-sectional view showing a method of manufacturing a carbon nanotube thin film according to an embodiment. The carbon nanotube thin films 110 included in the gas diffusion layer 100 according to an embodiment may be formed by a floating catalyst chemical vapor deposition ("FCCVD") method.

Referring to FIGS. 3 and 4, a carbon nanotube precursor 210 and a catalyst precursor 220 may be supplied in a reaction chamber 200 (Operation S110). According to the embodiment, the carbon nanotube precursor 210 may include ethanol, hexane, methane, or toluene, for example. Also, according to an embodiment, the catalyst precursor 220 may include a transition metal derivative, such as ferrocene or nikelocene, iron pentacarbonyl ($Fe(CO)_5$), ($ZrO_2$) oixde nanopowder, or a non-metal precursor. However, the embodiment is not limited thereto, and any material that may be understood by those in the art as a carbon nanotube precursor or a catalyst precursor to which the FCCVD method may be applied may be used. At this point, together with the carbon nanotube precursor 210 and the catalyst precursor 220, a material that restricts the growing of catalyst particles, for example, a growing-blocking source material 230, such as carbon disulfide may be supplied. The carbon nanotube precursor 210, the catalyst precursor 220, and the growing-blocking source material 230 may be supplied into the reaction chamber 200 by a carrier gas, such as a hydrogen gas $H_2$, an argon gas $Ar_2$, or a helium gas He.

Next, catalyst particles may be generated by thermally decomposing the catalyst precursor 220 supplied into the reaction chamber 200 (Operation S120). According to the embodiment, the catalyst precursor 220 introduced in the reaction chamber 200 moves along a flow of a carrier gas in the reaction chamber 200. A temperature in the reaction chamber 200 may be increased along the gas flow, and the catalyst precursor 220 may be decomposed at a first start temperature which is a decomposition temperature of the catalyst precursor 220. Catalyst particles 221 may be generated by the decomposition of the catalyst precursor 220, and the generated catalyst particles 221 may grow by combination. Afterwards, the growing-blocking source material 230 may decompose at a second start temperature, and accordingly, a growing-blocking agent may be discharged, and thus, the growing of the catalyst particles 221 may be blocked.

Next, a plurality of carbon nanotubes may be generated by thermally decomposing the carbon nanotube precursor 210 supplied into the reaction chamber 200 (Operation S130). After the second start temperature, the temperature in the reaction chamber 200 is increased to a third start temperature along the gas flow in the reaction chamber 200. The carbon nanotube precursor 210 is thermally decomposed at the third start temperature, and thus, a plurality of carbon nanotubes is generated.

Also, as an example, the carbon nanotubes may be densified by applying a densification agent, for example, acetone, and accordingly, the carbon nanotubes may be discharged as a plurality of fibrous forms.

Next, the first carbon nanotube thin film 111 may be generated by attaching the carbon nanotubes on a surface of a roller unit 260 that rotates with respect to an axis (Operation S140). The carbon nanotubes discharged from the reaction chamber 200 may be attached to the surface of the roller unit 260 that rotates with respect to an axis O at a predetermined speed, for example, in a range from 1 meter per minute (m/min) to 100 m/min, and more specifically, in a range from 1 m/min to 20 m/min. As an example, when the roller unit 260 having a diameter of 3 cm rotates at a rotational speed of 85 revolutions per minute (rpm), the first carbon nanotubes 1110 may be arranged to be aligned at a speed of 8 m/min or less along a direction of axis O of the roller unit 260 without aggregation. At this point, the degree of alignment and thickness of the first carbon nanotubes 1110 may be controlled by controlling the rotational speed of the roller unit 260. Accordingly, the first carbon nanotube thin film 111 in which the first carbon nanotubes 1110 having a flat type are arranged in a direction may be formed. Also, according to the embodiment, the roller unit 260 may repeatedly rotate more than two rotations, and accordingly, the second carbon nanotube thin film 112 in which the second carbon nanotubes 1120 having a flat type may be arranged to stack on the first carbon nanotube thin film 111.

Next, the roller unit 260 may have a rotational movement with respect to the axis O and, at the same time, may perform a translation motion in a direction of the axis O. Thus, the second carbon nanotube thin film 112 may be formed by attaching carbon nanotubes on a surface of the roller unit 260 that performs the rotational movement and the translation movement (Operation S150). Carbon nanotubes discharged from the reaction chamber 200 may be attached to a surface of the roller unit 260 that rotates at a certain speed with respect to an axis O and simultaneously performs a translation movement in a direction of the axis O at an attaching speed of, for example, in a range from 1 m/min to 100 m/min, and more particularly, from 1 m/min to 20 m/min. As an example, when the roller unit 260 having a diameter of 3 cm rotates at a rotational speed of 85 rpm, the second carbon nanotubes 1120 may be arranged to be aligned at a speed of 8 m/min or less along the direction of the axis O of the roller unit 260 without aggregation. Also, when the roller unit 260 rotates and simultaneously performs a translation motion at a speed of 0.7 m/min in the direction of the axis O, an alignment direction of the second carbon nanotubes 1120 may be inclined to an opposite direction of the translation motion of the roller unit 260.

As described above, the roller unit 260 on which the carbon nanotubes are arranged may rotate at least one rotation, and according to the number of rotations of the roller unit 260, a plurality of the carbon nanotube thin films 110 may be additionally stacked. In an embodiment, as depicted in FIG. 2B, when the roller unit 260 performs two rotations, the first carbon nanotube thin film 111 and the second carbon nanotube thin film 112 may be arranged to be stacked, for example. At this point, an alignment direction $n_1$ of the first carbon nanotubes 1110 and an alignment direction $n_2$ of the second carbon nanotubes 1120 may be defined by an extension direction and vertical direction of the carbon nanotubes, and, due to a translation motion of the roller unit 260 that follows the axis direction of the roller unit 260, the alignment direction $n_1$ of the first carbon nanotubes 1110 and the alignment direction $n_2$ of the second carbon nanotubes 1120 may be different from each other.

Figure 5:
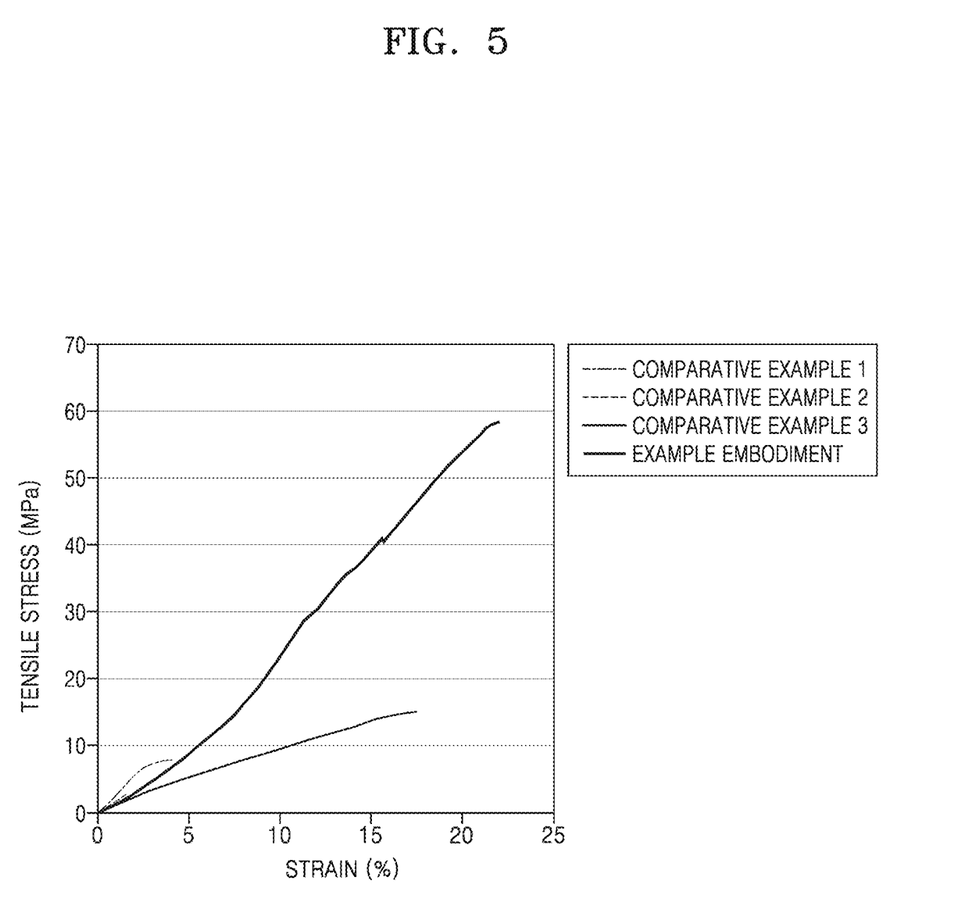
FIG. 5 is a graph showing an embodiment and a comparative example of a change in tensile strength of a gas diffusion layer.
Figure 6:
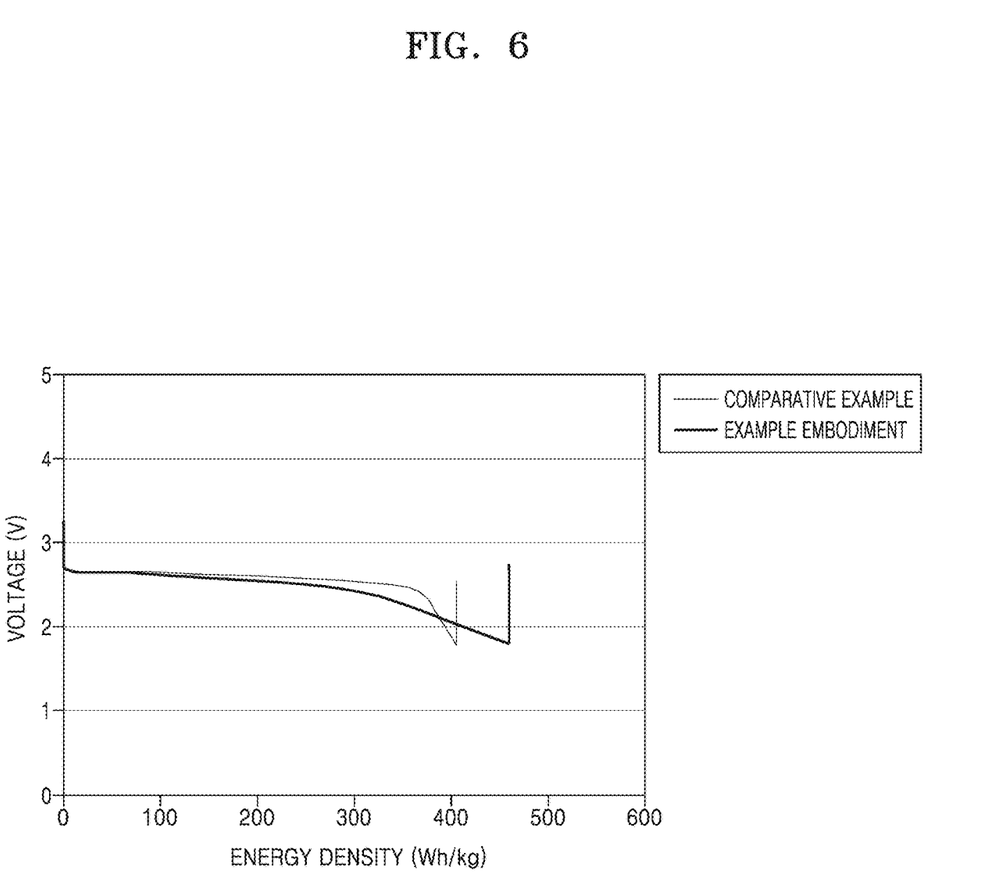
FIG. 6 is a graph showing an embodiment and a comparative example of measurement results of discharge capacity value per unit weight in terms of watt-hour per kilogram (Wh/kg) and an average voltage in terms of volt (V), which were obtained in a process of discharging a battery.
Figure 7:
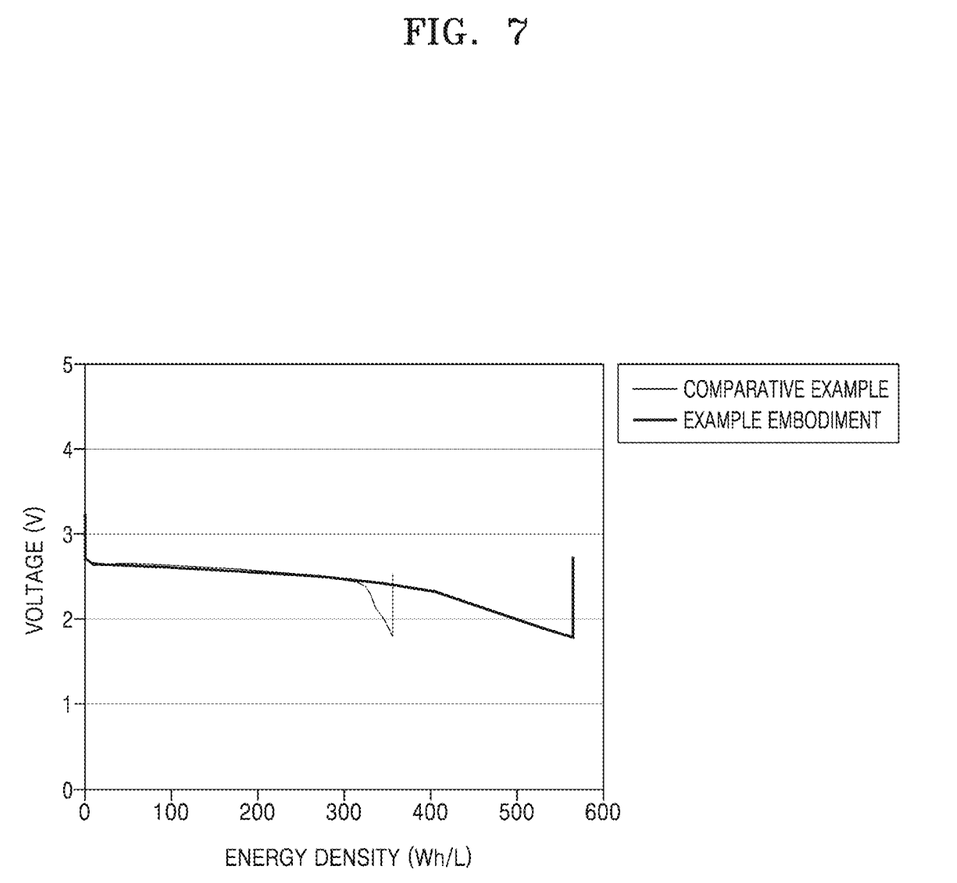
FIG. 7 is a graph showing an embodiment and a comparative example of measurement results of discharge capacity value per unit volume in terms of watt-hour per liter (Wh/L) and an average voltage (V), which were obtained in a process of discharging a battery.

FIG. 5 is a graph showing a change of tensile strength of a gas diffusion layer according to an embodiment and a comparative example. FIG. 6 is a graph showing measurement results of a discharge capacity value per weight in terms of watt-hour per kilogram (Wh/kg) and an average voltage in terms of volt (V) that are obtained in a process of discharging a battery according to an embodiment and a comparative example. FIG. 7 is a graph showing measurement results of a discharge capacity value per volume in terms of watt-hour per liter (Wh/L) and an average voltage (V) that are obtained in a process of discharging a battery according to an embodiment and a comparative example.

The gas diffusion layer 100 including the carbon nanotube thin films 110 according to the embodiment may have a tensile strength of about 20 megapascals (MPa) or above. As an example, referring to FIG. 5 and Table 1 below, tensile strengths and electrical conductivities of a carbon nanotube thin film (Comparative example 1) in which a plurality of carbon nanotubes are grown in a direction, a carbon nanotube thin film in which powder state carbon nanotubes are dispersed (Comparative example 2), and a single carbon nanotube thin film 110 including a plurality of carbon nanotubes 110 (Comparative example 3) respectively are less than 20 MPa and less than 200 S/Cm. However, the gas diffusion layer 100 including the first carbon nanotube thin film 111 and the second carbon nanotube thin film 112 those includes a plurality of aligned carbon nanotubes has a tensile strength of 20 MPa or above and an electrical conductivity of 200 S/Cm or above. Also, a weight per unit area mg/cm$^2$ of the carbon nanotubes according to the Comparative example 2 is greater than 1. However, a weight per unit area mg/cm$^2$ of the gas diffusion layer 100 according to the embodiment is less than 1.

TABLE 1

|  | Comparative example 1 | Comparative example 2 | Comparative example 3 | embodiment |
| --- | --- | --- | --- | --- |
| Tensile strength (MPa) | 8.0 | 2.7 | 15.2 | 58.3 |
| Electrical conductivity (S/cm) | 37 | 10 | 161 | 299 |

TABLE 1-continued

| | Comparative example 1 | Comparative example 2 | Comparative example 3 | embodiment |
|---|---|---|---|---|
| Thickness (μm) | 10 | 30 | 15 | 15 |
| Weight (mg/cm$^2$) | 0.5 | 1 | 0.5 | 0.5 |

Accordingly, in the related art, it is also possible to make a carbon nanotube thin film in a type in which powder state carbon nanotubes are arranged, a carbon nanotube thin film in which carbon nanotubes that are formed by an FCCVD method are dispersed in random directions without being aligned, or a carbon nanotube thin film in which a plurality of carbon nanotubes are grown in a direction from an aligning start point. However, the gas diffusion layer 100 including the plurality of carbon nanotube thin films 110 according to the embodiment may realize the metal-air battery 1a having a high energy density by realizing a mechanical strength and a light-weight while providing a predetermined electrical conductivity and porosity.

Hereinafter, the invention is described by explaining the embodiments, but the invention is not limited thereto.

Embodiment (Manufacture a Gas Diffusion Layer)
Embodiment and Comparative example: Manufacture of a lithium-air battery Embodiment A gas diffusion layer in which a first carbon nanotube thin film and a second carbon nanotube thin film are arranged in a stack structure was formed by mixing carbon nanotubes that are formed by an FCCVD method and include a loading amount of 0.45 mg as a cathode catalyst with 1-ethyl-3-methylimidazolium bis(trifluoromethylsulfonyl)imide (Aldrich) to which 0.5 M lithium bis(trifluoromethylsulphonyl)imide with excess ratio is added.

Comparative Example

A Sigracet 25BA, SGL Group was used as a gas diffusion layer.

(Manufacture a Cathode)
A cathode was manufactured by mixing NC2100, Nanocyl as a cathode catalyst, 1-Ethyl-3-methylimidazolium bis(trifluoromethylsulfonyl)imide (Aldrich) to which 0.5 M lithium bis(trifluoromethylsulphonyl)imide is added as a cathode electrolyte, and polytetrafluoroethylene (PTFE, DAIKIN) in a weight ratio of 1:2:0.2.

(Manufacture an Electrolyte Film)
After mixing N-butyl-N-methylpyrrolidinium bis(trifluoromethanesulfonyl)imide ("KANTO"), poly(diallyldimethylammonium bis(trifluoromethanesulfonyl)imide), and lithium bis(trifluoromethylsulphonyl)imiden in a weight ratio of 75:17.6:7.4, and diluting the combination with acetonitrile, an electrolyte film was manufactured by impregnating the diluted solution in polyethylene ("PE") separation film (Entek EPX).

(Manufacture a Lithium-Air Battery)
A folded lithium-air battery was manufactured by sequentially stacking an electrode film, a cathode, and a gas diffusion layer on a lithium foil anode.

Evaluation: Discharge Characteristic and Energy Density
The lithium-air battery manufactured was fully discharged and charged with a current density of 0.24 milliampere per square centimeter (mA/cm$^2$) at a temperature of 80 degrees Celsius under an oxygen atmosphere. A discharge capacity Wh/kg according to weight obtained in a discharge process and an average voltage V are measured and the results are shown in FIG. 6. A discharge capacity Wh/kg according to volume obtained in a discharge process and an average voltage V are measured and the results are shown in FIG. 7.

Energy densities of an Embodiment and Comparative example may be evaluated based on the evaluation results of the discharge characteristics.

TABLE 2

| | Comparative example | Embodiment |
|---|---|---|
| Energy density per weight (Wh/kg) | 541 | 614 |
| Energy density per volume (Wh/L) | 354 | 563 |

Referring to Table 2, the lithium-air battery manufactured according to the embodiment has a higher energy density when compared to the lithium-air battery manufactured according to Comparative example.

As described above, the metal-air battery according to an embodiment has a high energy density. A gas diffusion layer for the metal-air battery according to an embodiment may have a light-weight and also may ensure electrical conductivity and gas diffusivity.

While one or more embodiments have been described with reference to the drawing figures, it will be understood by those of ordinary skill in the art that various changes in form and details may be made therein without departing from the spirit and scope as defined by the following claims.

What is claimed is:

1. A metal-air battery comprising:
    an anode layer comprising a metal;
    a cathode layer which comprises a cathode catalyst layer and uses oxygen as an active material;
    a gas diffusion layer which is in contact with the cathode layer and comprises a plurality of carbon nanotube thin films stacked on each other, wherein the gas diffusion layer has an average tensile strength of 20 megapascals or above; and
    an electrolyte film between the anode layer and the cathode layer,
    wherein the plurality of carbon nanotube thin films comprises:
    a first carbon nanotube thin film comprising a plurality of first carbon nanotubes extending in a first direction; and
    a second carbon nanotube thin film comprising a plurality of second carbon nanotubes extending in a second direction.

2. The metal-air battery of claim 1, wherein the first and second carbon nanotube thin films have a flat plate form and the first and second carbon nanotube thin films are stacked parallel to each other.

3. The metal-air battery of claim 1, wherein the plurality of first carbon nanotubes comprised in the first carbon nanotube thin film is respectively aligned along a direction perpendicular to the first direction, and the plurality of second carbon nanotubes comprised in the second carbon nanotube thin film is respectively aligned along a direction perpendicular to the second direction.

4. The metal-air battery of claim 3, wherein the alignment direction perpendicular to the first direction and the alignment direction perpendicular to the second direction are different from each other.

5. The metal-air battery of claim 3, wherein an alignment angle of the first carbon nanotubes has a deviation in a range of 0 degree to 45 degrees in a clockwise direction or a counter-clockwise direction, and an alignment angle of the second carbon nanotubes has a deviation in a range from 0 degree to 45 degrees in the clockwise direction or the counter-clockwise direction.

6. The metal-air battery of claim 1, wherein the first carbon nanotube thin film and the second carbon nanotube thin film have different porosities from each other.

7. The metal-air battery of claim 1, wherein the first carbon nanotube thin film and the second carbon nanotube thin film have different electrical conductivities from each other.

8. The metal-air battery of claim 1, wherein one of the first carbon nanotube thin film and the second carbon nanotube thin film has an average electrical conductivity of less than 0.1 Siemen per centimeter.

9. The metal-air battery of claim 1, wherein the cathode layer, the electrolyte film, the anode layer, and the gas diffusion layer are folded at least once.

10. The metal-air battery of claim 1, wherein the gas diffusion layer has oxygen permeability in a thickness direction thereof.

11. The metal-air battery of claim 1, wherein the gas diffusion layer has a thickness of less than 100 micrometers, and has a weight per unit area of less than 1 milligram per square centimeter.

12. The metal-air battery of claim 1, wherein the first carbon nanotubes and the second carbon nanotubes are single carbon nanotubes, carbon nanotube bundles, or twisted carbon nanotubes.

13. A method of manufacturing a gas diffusion layer, the method comprising:
supplying a carbon nanotube precursor and a catalyst precursor into a reaction chamber;
generating catalyst particles by thermally decomposing the catalyst precursor in the reaction chamber;
forming a plurality of carbon nanotubes by thermally decomposing the carbon nanotube precursor in the reaction chamber; and
attaching the plurality of carbon nanotubes to a surface of a roller unit which rotates with respect to an axis,
wherein the roller unit forms a plurality of carbon nanotube thin films by repeatedly rotating at least twice.

14. The method of claim 13, wherein the plurality of carbon nanotubes comprised in the plurality of carbon nanotube thin films is respectively aligned in a direction perpendicular to a direction in which the plurality of carbon nanotubes extends, and an alignment angle of the plurality of carbon nanotubes has a deviation in a range of 0 degree to 45 degrees in a clockwise direction or a counter-clockwise direction.

15. The method of claim 13, wherein the roller unit simultaneously performs a rotational motion and a translational motion along a direction of the axis.

16. The method of claim 15, wherein first carbon nanotubes comprised in a first carbon nanotube thin film are respectively aligned along a direction perpendicular to a direction in which the first carbon nanotubes extend, and second carbon nanotubes comprised in a second carbon nanotube thin film are respectively arranged along a direction perpendicular to a direction in which the second carbon nanotubes extend, wherein the alignment direction perpendicular to the extending direction of the first carbon nanotubes and the alignment direction perpendicular to the extending direction of the second carbon nanotubes are different from each other.

* * * * *